US012756493B2

(12) United States Patent
Breuer

(10) Patent No.: US 12,756,493 B2
(45) Date of Patent: Oct. 6, 2026

(54) RADIO JAMMING DETECTION

(71) Applicant: Telit Cinterion Deutschland GmbH, Munich (DE)

(72) Inventor: Volker Breuer, Botzow (DE)

(73) Assignee: Telit Cinterion Deutschland GmbH, Munich (DE)

( * ) Notice: Subject to any disclaimer, the term of this patent is extended or adjusted under 35 U.S.C. 154(b) by 339 days.

(21) Appl. No.: 18/552,740

(22) PCT Filed: Mar. 29, 2022

(86) PCT No.: PCT/EP2022/058274
§ 371 (c)(1),
(2) Date: Sep. 27, 2023

(87) PCT Pub. No.: WO2022/214358
PCT Pub. Date: Oct. 13, 2022

(65) Prior Publication Data
US 2024/0171298 A1 May 23, 2024

(30) Foreign Application Priority Data
Apr. 9, 2021 (EP) .................................... 21167536

(51) Int. Cl.
*H04K 3/00* (2006.01)

(52) U.S. Cl.
CPC .................................... *H04K 3/222* (2013.01)

(58) Field of Classification Search
None
See application file for complete search history.

(56) References Cited

U.S. PATENT DOCUMENTS 9,614,640 B2 * 4/2017 Breuer ...................... H04K 3/22
9,621,207 B2 * 4/2017 Welnick ............... H04B 1/1027
(Continued)

FOREIGN PATENT DOCUMENTS

CN 109588059 A 4/2019
CN 110268744 A 9/2019
(Continued)

OTHER PUBLICATIONS

Qiao Hu et al. "Practical limitation of co-operative RFID jamming methods in environments without accurate signal synchronization," Computer Networks, vol. 105, 2016, pp. 224-236. (Year: 2016).*
(Continued)

*Primary Examiner* — Melvin H Pollack
(74) *Attorney, Agent, or Firm* — PEARL COHEN LLP

(57) ABSTRACT

The present invention relates to a method to detect a jamming situation, affecting a communication user equipment, said user equipment being adapted for communication with a base node of a new radio network (RN) said method comprising the steps of, for the user equipment, measuring the new radio bandwidth and, in case of detection of an energy in the measured band sufficient for decoding found synchronization signal blocks, attempting to decode at least a synchronization signal block in the new radio bandwidth, in the case no decoding is possible and in presence of an indication that new radio is deployed in this area, concluding that the user equipment is affected by a jamming situation, in the case a decoding of at least one synchronization signal block is possible, checking that a cell defining synchronization signal block is decoded, if no cell defining synchronization signal block is decoded, verifying if a part of the new radio bandwidth shows a high received signal strength indication, if yes, concluding that the user equipment is affected by a jamming situation.

12 Claims, 2 Drawing Sheets

(56) References Cited

U.S. PATENT DOCUMENTS

| | | | | |
|---|---|---|---|---|
| 10,263,726 B2 * | 4/2019 | Breuer | H04K 3/222 | |
| 10,490,059 B2 * | 11/2019 | Gilson | H04Q 9/00 | |
| 10,511,404 B2 * | 12/2019 | Trundle | G08B 25/10 | |
| 10,545,245 B2 * | 1/2020 | Ying | H04K 3/90 | |
| 10,623,131 B2 * | 4/2020 | Breuer | G08B 29/046 | |
| 10,784,910 B1 * | 9/2020 | Chang | H04B 1/126 | |
| 10,826,645 B2 * | 11/2020 | Zeng | G06F 17/11 | |
| 10,917,192 B2 * | 2/2021 | Pajovic | H04K 3/228 | |
| 10,985,876 B2 * | 4/2021 | Xiong | H04L 1/1858 | |
| 11,140,645 B2 * | 10/2021 | Jean | H04L 67/12 | |
| 11,153,026 B2 * | 10/2021 | Pierson | H04K 3/43 | |
| 11,233,597 B2 * | 1/2022 | Agarwal | H04B 17/345 | |
| 11,265,375 B2 * | 3/2022 | Liberti | H04L 67/1095 | |
| 11,284,404 B2 * | 3/2022 | Noble | H04L 5/0062 | |
| 11,387,931 B2 * | 7/2022 | Shaham | H04B 7/0617 | |
| 11,394,482 B2 * | 7/2022 | Sevindik | H04W 8/02 | |
| 11,664,922 B2 * | 5/2023 | Pang | H04K 3/226 | 455/1 |
| 11,698,461 B1 * | 7/2023 | Messina | G01S 19/258 | 342/14 |
| 11,927,923 B2 * | 3/2024 | Hisashima | G04G 7/023 | |
| 11,985,504 B2 * | 5/2024 | Ljung | H04W 12/122 | |
| 12,114,212 B2 * | 10/2024 | Teyeb | H04W 36/08 | |
| 12,225,456 B2 * | 2/2025 | Lee | H04W 48/20 | |
| 12,262,314 B2 * | 3/2025 | Venkataraman | H04W 72/0453 | |
| 12,289,696 B2 * | 4/2025 | Cheng | H04W 56/001 | |
| 12,452,738 B2 * | 10/2025 | Da Silva | H04W 48/12 | |
| 2016/0330069 A1 * | 11/2016 | Nordmark | G08B 29/08 | |
| 2020/0153535 A1 * | 5/2020 | Jayaweera Kankanamge | H04B 1/0003 | |
| 2021/0067265 A1 * | 3/2021 | Agarwal | H04K 3/224 | |
| 2021/0083794 A1 | 3/2021 | Agarwal et al. | | |
| 2021/0306856 A1 * | 9/2021 | Mildh | H04K 3/224 | |
| 2023/0231644 A1 * | 7/2023 | Korpi | H04K 3/228 | 455/296 |
| 2023/0246728 A1 * | 8/2023 | Baracca | H04K 3/28 | 455/1 |

FOREIGN PATENT DOCUMENTS

| | | | | |
|---|---|---|---|---|
| EP | 2850760 B1 * | 2/2021 | H04K 3/222 | |
| EP | 3345319 B1 * | 6/2022 | H04K 3/226 | |
| FI | 3602850 T3 * | 8/2023 | H04B 17/345 | |
| JP | 2020150539 | 9/2020 | | |
| JP | 2021175195 | 11/2021 | | |
| KR | 20120135208 A | 12/2012 | | |
| KR | 20140041314 A | 4/2014 | | |
| WO | WO2013/072493 | 5/2013 | | |
| WO | WO-2021244726 A1 * | 12/2021 | H04K 3/228 | |

OTHER PUBLICATIONS

M. Spuhler, D. Giustiniano, V. Lenders, M. Wilhelm and J. B. Schmitt, “Detection of Reactive Jamming in DSSS-based Wireless Communications,” in IEEE Transactions on Wireless Communications, vol. 13, No. 3, pp. 1593-1603, Mar. 2014. (Year: 2014).*

C. Popper, M. Strasser and S. Capkun, “Anti-jamming broadcast communication using uncoordinated spread spectrum techniques,” in IEEE Journal on Selected Areas in Communications, vol. 28, No. 5, pp. 703-715, Jun. 2010. (Year: 2010).*

J. Zhang, N. Ge, Z. Wang and S. Chen, “Fast Antijamming Timing Acquisition Using Multilayer Synchronization Sequence,” in IEEE Transactions on Vehicular Technology, vol. 62, No. 7, pp. 3497-3503, Sep. 2013. (Year: 2013).*

Wenyuan Xu, Wade Trappe, and Yanyong Zhang. 2008. Anti-jamming timing channels for wireless networks. In Proceedings of the first ACM conference on Wireless network security (WiSec ’08). Association for Computing Machinery, New York, NY, USA, 203-213. (Year: 2008).*

A. El-Keyi, O. ÜReten, H. Yanikomeroglu and T. Yensen, “LTE for Public Safety Networks: Synchronization in the Presence of Jamming,” in IEEE Access, vol. 5, pp. 20800-20813, 2017. (Year: 2017).*

Lichtman, Marc & Rao, Raghunandan & Marojevic, Vuk & Reed, Jeffrey & Piqueras Jover, Roger “5G NR Jamming, Spoofing, and Sniffing: Threat Assessment and Mitigation” pp. 1-6., May 2018.

3GPP TR38.801 3rd Generation Partnership Project; Technical Specification Group Radio Access Network “Study on new radio access technology: Radio access architecture and interfaces”, (Release 14), Mar. 2017.

3GPP TS 36.331 3rd Generation Partnership Project; Technical Specification Group Radio Access Network; Evolved Universal Terrestrial Radio Access (E-UTRA); Radio Resource Control (RRC); Protocol specification (Release 15) Dec. 2020.

3GPP TS 38.213 3rd Generation Partnership Project; Technical Specification Group Radio Access Network; NR, “Physical layer procedures for control”, (Release 15) Dec. 2020.

3GPP TS 38.331 3rd Generation Partnership Project; Technical Specification Group Radio Access Network; NR, “Radio Resource Control (RRC) protocol specification” (Release 15) Dec. 2020.

3GPP TS38.101-1 3rd Generation Partnership Project; Technical Specification Group Radio Access Network; NR, “User Equipment (UE) radio transmission and reception”, Part 1: Range 1 Standalone, (Release 15) Dec. 2020.

3GPP TS38.300 3rd Generation Partnership Project; Technical Specification Group Radio Access Network; NR, “NR and NG-RAN Overall Description”, Stage 2, (Release 15) Mar. 2021.

* cited by examiner

RADIO JAMMING DETECTION

CROSS-REFERENCE TO RELATED APPLICATIONS

This application is a National Phase Application of PCT International Application No. PCT/EP2022/058274, International Filing Date Mar. 29, 2022, claiming the benefit of European Patent Application No. 21167536.8 filed Apr. 9, 2021, which are hereby incorporated by reference in their entirety.

FIELD OF THE INVENTION

The present invention relates to a method to detect a jamming situation, affecting a communication user equipment, said user equipment being adapted for communication with a base node of a new radio network (RN) acting on a new radio bandwidth in a given area, wherein the new radio network uses a specific carrier design to provide synchronization signals to the user equipment, said specific carrier design implementing multiple subcarrier spacing to broadcast multiple synchronization signal blocks where no cell specific reference signal is used but where one of the synchronization signal blocks is a cell defining synchronization signal block.

The invention also pertains to a user equipment implementing said method to detect jamming situation.

BACKGROUND OF THE INVENTION

This invention relates to jamming detection. Such a detection is crucial for many real time application, the first of which being the automotive field where cars will rely on the network to evaluate necessary actions, for example in case of dangerous situations.

Main aspects already claimed in the field of 5G can be applied for jamming detection for 5G especially the ones developed for 3G/4G. However 5G presents specific aspects which need to be addressed more precisely than in previous solutions. In particular the 5G wideband deployments, especially in the upper frequency range of FR1 (i.e. 3 GHZ and above) but also important for FR2 frequency range and the architecture options available for 5G, among which the non-standalone architecture (NSA) leads to specific issues.

Thus 5G is different compared to LTE and has also some differences in jamming detection compared to legacy, i.e. 4G systems. Especially the jamming detection solution are not adapted for idle mode and new 5G inactive mode.

It needs to be noted that one of the basics of 5G is the clean carrier design compared to LTE. It means that there is no cell specific reference signals in the carrier design. The cell specific reference signals being always present in LTE and UMTS, this is largely used for jamming detection.

Indeed the device detects an energy in the carrier being well above noise and should be sufficient for measuring and identifying the UMTS or LTE reference symbols. It is not the case when the device is in a jamming situation which can so be detected.

In 5G, measurements can only be done via the synchronization signal blocks SSB which each comprise P-SCH and S-SCH synchronization signals, as 5G does not have and cell specific reference signals.

Detecting jamming via synchronization channels is in a general form known and already claimed in WO2013072493.

However, that Boolean statement P-SCH/S-SCH detectable/not detectable being mapped to jamming or not jamming is not adapted in 5G.

New radio 5G, especially in its wideband deployments using multiple band parts, provides more than one SS-block in time and frequency domain. In frequency they serve as references signals. It is especially the case in wideband deployments with multiple subcarrier spacing (SCS) deployments. In time domain, they serve as reference for the different beam directions. It means that P-SCH and S-SCH will be possible to be received at the user equipment device while the user equipment is jammed on a part of the frequency domain.

Being detectable in time domain does not cause such an issue for jamming, as in case of jamming of a part of the band, all the SSB will be jammed and jamming a certain beam would require knowledge on the beam-sweep timing and direction. So in time domain a jamming attack will mask all beams.

However in frequency domains the SS-blocks have not the same general meaning. A part of the frequency band being jammed, it will always be possible to receive the P-SCH and S-SCH in one of the SS-blocks. The jamming will thus not be detectable with the solution of the prior art.

In prior art, the fact that a synchronization channel SCH cannot be received indicates jamming. But in 5G this method fails.

Moreover, 5G is different compared to LTE and a special new attribute is the architecture options. Indeed 5G may be deployed as standalone technology or in conjunction with another technology as non-standalone technology.

The non-standalone deployment option is different compared to what existed so far. And the jamming evaluations of LTE or also those of SA are only partially applicable as it may otherwise lead to false reports and evaluations.

Architecture options are disclosed in the 3GPP standard TR38.801 (chapter 7.2) and architecture option 3 and 7 are non-standalone NSA architecture options known as early drop and also as late drop.

Underlay overlay options or hierarchical cell structure existed already earlier and they are well understood also with respect to jamming but NSA architecture is different in nature. It does not consist of two independent radio access technologies RAT of the same or different technology. A NSA architecture consists of 2 RATS where only one of them provides the necessary registration capabilities.

In general there is one master Node and one "secondary" node. Regardless whether the first/master Node is LTE or 5G, the master Node is the Node which manages and contains all necessary signaling for registering the device. This includes providing necessary SIBs or indications where to find the necessary SIB and being able to register to the core network regardless whether MME or AMF means 4G or 5G. Moreover it is the master Node which maintains said NAS (non-access stratum signaling) towards the MME or AMF and hence the way for registering said device towards the network.

The secondary Node regardless whether LTE or NR will not provide any registration information i.e. no System Information beyond MIB/and coreset1 in NR. It means that no SIB1 indication present or this indication states that there is no SIB1 in the considered cell. Hence the 5G cell cannot be used for camping and is only a throughput boosting node in NSA deployments i.e. access and assignment is done via another Node.

In practice, it could be a LTE cell using a NSA 5G cell to boost the traffic in dedicated mode or an NR cell which uses a secondary NR cell to boost the traffic. In later scenarios master cell could be in FR1 and secondary cell in FR2. In these scenarios where the secondary cell is used for traffic offloading in dedicated mode, the device will not be able to camp on the 5G cell. It is different compared to cells used for current traffic offloading or carrier aggregation. Indeed in these 3G/4G concepts, users which have low speed are forced or indicated to camp on these legacy cells. In carrier aggregation used in 4G two fully fletched cells serve together one user equipment for maximising the throughput, whilst the devices could camp in idle on any of said two cells. However, in an NSA deployment the device can only camp in idle or inactive on the master cell, such NSA deployments avoid the need for providing registration information or broadcast SIBs in the secondary Node.

All control information required for registration are solely provided via the master node, i.e. Non-access stratum NAS signaling and SIB provisioning.

Once the device is in connected mode, the data connection is set-up via the new radio base station and delivered via a primary eNB or directly to the LTE network core. It works once connected but not to access or to camp.

The tight inter-working of LTE and NR is one of the major aspects. Hence non-standalone architectures need also to be analyzed with the requisites to jamming detection.

Considering NSA deployments with secondary cell not providing any SIBs except e.g. MIB and indicating at best "no SIB1 present" do not need to be jammed. Here, even if all the 5G frame is received, as the 5G cell is not intended for camping, the device will not be able to access or camp as soon as the primary cell will not be available and connected to the core network or if said primary cell is jammed. Such a jamming is advantageously detected by the user equipment by analyzing what is received from the primary base cell.

However, at the user equipment side, it receives data from the non-standalone 5G cell without being able to connect or to continue to camp if it was already camping on this cell.

So far jamming was only considered and evaluated for each technology separate which is efficient in case of SA deployment. In this case, each technology is evaluated separately. Thus, in case of NSA, evaluation of secondary node can be avoided, as it is not able to provide connectivity on its own.

Hence regardless whether it is jammed or not, it does not change the situation i.e. the purpose of jamming is blocking communication and in an NSA architecture, there is no need to block secondary Node. The secondary node cannot anyhow open a connection on its own when the master Node is jammed. So the measuring and decoding does not increase the jamming detection level/confidence. Also the user equipment will continue its attempts to connect to any 5G cells, including non-standalone ones, as it receives signal on 5G and will proceed with decoding unless it encounters being an NSA cell and addressing next 5G cell afterwards.

The method of the invention also addresses such a situation where synchronization signal blocks are normally received in new radio, including cell defining synchronization signal block. As said above, this means not being necessarily sufficient for camping, as said cell could be an NSA cell, i.e. the cell defining block just provides information on SIB1 absence. Contrarily a 5G standalone cell provides at least one cell defining synchronization signal block which provides information to SIB1 and corset #0, which enables the UE to register and to setup a connection.

The process of scanning and evaluating all available 5G cells without any prior knowledge, is very power and time consuming and may unnecessarily delay the conclusion or deriving the confidence level.

Further alternative and advantageous solutions would, accordingly, be desirable in the art to detect and evaluate jamming in 5G domain.

SUMMARY OF THE INVENTION

The present invention aims at enabling jamming to be detected in various specific deployment and architecture encountered in 5G.

The present invention is defined, in its broadest sense, as a method according to the preamble, wherein said user equipment being in the given area and having further access to an indication that new radio is deployed in this given area, said method comprises the steps of, for the user equipment:

- measuring the new radio bandwidth and, in case of detection of an energy in the measured band sufficient for decoding found synchronization signal blocks:
- attempting to decode at least a synchronization signal block in the new radio bandwidth,
- in the case no decoding is possible and in presence of an indication that new radio is deployed in this area, concluding that the user equipment is affected by a jamming situation,
- in the case a decoding of at least one synchronization signal block is possible, checking that a cell defining synchronization signal block is decoded,
- if no cell defining synchronization signal block is decoded and in case a part of the new radio bandwidth shows a high received signal strength indication, concluding that the user equipment is affected by a jamming situation.

The invention distinguishes the content of which of the "reference signals" for 5G mapped to SS-blocks is jammed. The decision of being jammed or not depends on the decoding result related to a bandwidth part received.

The invention is indeed based on the fact that it is easy to jam only the CD-SSB as there are only a number of discrete positions used for providing the SS-blocks in a band to ease search time. SS-blocks can be used within a certain raster depending on the overall NR bandwidth. Operators often restrict it further, but there is no strict rule which of the SS-blocks is the CD-SS-block. It can be in the middle but not necessarily anytime. In any case, it is feasible, for a jammer, to determine which frequency area is the one where the CD-SS block is located. Such a jamming situation affects all camping users after a while. Indeed, in idle mode, the system information to access and get connected, i.e. SIBs, need to be read again from time to time and also when changing state from idle to active, i.e. in the case of a user equipment originated call. In such cases, the user equipment will first need to check whether access information have changed or are still valid, which means to check master information block MIB containing indication for the SIB1 and the first system information block itself. SIB1, which would lead to CD-SSB detection failure and jamming with high probability as the cell was accessible some time ago. However such situations were not detected with the prior art methods.

The invention enables to detect that the most important SSB is missing while the PBCH carrying the MIB is decodable in the decodable synchronization signal block(s) but does not contain necessary information related to SIB1. Without the invention and with the prior art solutions, the possibility to detect the SS-block or to decode the PBCH will lead to a no jamming decision which will be a wrong decision.

If no CD-SSB is found, the next question according to the invention is whether a bandwidth part of the cell was masked, i.e. containing more energy as said SS-block but being not decodable. The real CD-SSB is there awaited to be in this high energy bandwidth part. If so the probability for jamming is very high and a jamming situation is detected.

If not this could be a misconfiguration of the 5G cell. Even a 5G cell used for NSA operation would also provide a CD-SSB, which would indicate no SIB1 present. Hence such network total misconfiguration is unlikely to happen, i.e. having a 5G cell without a CD-SSB, so jamming is possible or abnormal condition detected should be considered in anyway and a new band shall be searched.

With the invention, if a cell defining synchronization signal block CD-SSB is found, the user equipment shall operate as specified.

The jamming method of the invention not only considers whether synchronization signal is decodable but also what is the content of received structure and whether a bandwidth part is masked which would contain the cell defining block. The method is an enhancement compared to existing methods applied for 4G. With existing methods, the user equipment could be jammed but normal jamming routines would not remark it.

With the invention the content of the subcarrier is taken into account to determine if a cell defining synchronization signal block is well received including the necessary SIB1 indication information. In this case the remaining minimum system information RMSI is available and the user equipment is able to connect and camp on the considered 5G cell. If a CD-SSB is received indicating the absence of SIB1, i.e. from an NSA architecture, other 5G cells may be searched without any further knowledge and this cell is discarded in further jamming evaluation as not being suitable for setting up a connection on its own.

It is here noted that user equipment designates any device, module or handset or radio communication capable device on new radio.

According to an advantageous feature, the method further comprises, following the step of verifying if a part of the new radio bandwidth shows a high received signal strength energy which should be sufficient for signal decoding, a step of verifying that this part of the new radio bandwidth showing a high received signal strength, has a bandwidth sufficient to hide a synchronization signal block, before concluding that the user equipment is affected by a jamming situation.

The signal strength being sufficient for decoding of an SS-block or 5G signal can be retrieved from TS38.101 that contains minimum requirements for signal decoding for user equipment. The bandwidth sufficient to hide an SS-block can be calculated by the minimum subcarrier spacing (SCS) used in said frequency range×240, subcarriers being of the SS-block SCS width. It enables to verify that the measured wideband energy corresponds to a 5G SS-block signal/subcarriers.

This step enforces the liability of the detection of a jamming situation as enhanced jammers may only pollute a part of the band which corresponds to the width of the SS-block and avoid fail jamming detection due to narrowband spikes which may have other reasons i.e. not due to a jammer.

According to an advantageous feature, said user equipment monitoring a confidence level register regarding jamming, once a jamming situation detected, said method further comprises the step of searching next frequency band and the step of increasing the confidence level register in case same result is obtained while applying the method to next frequency band.

The implementation of a confidence level register enables to reinforce the liability of the detection of the jamming situation. Such confidence levels can be used for early decision unless evaluation of all bands and frequencies is terminated.

According to a further advantageous feature, the confidence level register is reset to zero if any of the scanned band is fully accessible.

The use of a confidence level register thus also enables to cancel the jamming situation detection and related actions if ever.

The method of the invention enables to detect jamming situations for cell authorizing direct connections and camping. For other 5G cells implementing non-standalone architecture, a MIB will be provided by the non-standalone 5G cell, a cell defining SSB will be decoded but it will indicate that the access information like SIB1 is not present. The non-standalone 5G cell will hence be not suited for camping and only a jamming situation performed on the primary cell, whatever it is a LTE cell or a 5G cell, needs to be evaluated for jamming. The secondary node situation whether jammed or not does not make any difference on the jamming evaluation as the goal of jamming would be reached as the secondary cell cannot setup a connection. It means that a cell defining synchronization signal block CD-SSB is present but no NAS signaling is possible and no essential SIB1 decoding information, as SIB1 is not signaled. Consequentially no further SIBs which would be indicated in SIB1 are present and hence there are no means, for accessing the cell.

For this purpose the method of the invention advantageously further includes the following steps:

- in case a cell defining synchronization signal block is decoded, checking if a first system information block comprising access information to access to the cell is indicated,
- if no first system information block SIB1 indication is present in the cell defining synchronization signal block, checking if a stored system information indicating new radio cells which can be used for camping is available,
- if yes, scanning the indicated new radio cells,
- detecting further jamming situation if ever by applying the present jamming detection method in new radio while scanning these indicated new radio cells.

Such further steps enable a jamming evaluation taking into account the 5G architecture option of the considered cells and the related previously received system information. With the invention, the evaluation whether to consider a certain technology or set of frequencies of a technology for further jamming evaluation depends on information available i.e. whether standalone is deployed which will be indicated by the presence of a block SIB24 in LTE, or whether only measurement ordered in connected mode for additional data pipe to be setup.

The related previously received system information enables to restrict the search of secondary cells. It is advantageous as searching all secondary cells in such an architecture would lead to an enormous delay in jamming detection.

Hence the method further takes also into account the NSA architecture options. Certain information present or not present in said cell or received from a previous cell cause the device and jamming procedure to refrain from searching and analyzing cells of the secondary technology or frequency range and evaluate jamming detection solely at the master/primary cells, being suitable for camping only, whatever it is LTE or 5G radio cells.

The invention thus enables improved jamming detection which also works for non-standalone architectures introduced with the standardization of 5G.

Due to the increasing number of technologies and bands also jamming needs to be optimized in a smart manner. This is what the invention does by only verifying whether cells are jammed which could serve as suitable camping and registration cells, which is for the new architectures for LTE-NR tight interworking no more the case under all circumstances. With the invention the user equipment shall use stored SIB information to focus its search for the current PLMN it is camping on.

The same applies also for NR-NR scenarios, especially where the secondary NR cell is from FR2 and only used in such NSA scenarios. Hence said cell is not suited for camping and only serves as data pipe in connected mode. Searching FR2 cells and trying to decode without any prior knowledge would cause quite some delay in the jamming detection.

The invention is a new jamming detection procedure considering stored system information for deriving the technologies and frequencies which need to be evaluated for jamming detection. By use of stored information jamming detection is adapted to the new architecture options concerning LTE-NR or NR-NR. The jamming evaluation is made faster and more efficient and false jamming indications are avoided. Jamming situation with 5G non-standalone or dependent network architectures in general can be detected with the invention. With the selection of the cells and frequencies to be scanned, the jamming evaluation, when no jamming is detected by an absence of cell defining synchronization signal block, is solely based on the master cells of the architecture i.e. the cells being responsible for registration communication and in consequence, for camping. Certain indications are evaluated and stored whether the device is in a non-standalone or whether the other RAT can also be seen as a standalone carrier.

According to a particular feature, the checked stored system information indicating new radio cells which can be used for camping and having been received using a a previous camping radio access technology comprises inter-RAT reselection system information listing frequencies for inter-RAT cell re-selection, which can also be used for NR measurements.

In case of LTE-NR tight interworking this is the previous legacy RAT LTE which comprises inter-RAT reselection system information. This feature enables to select a list of cells and frequencies to be scanned for a new radio reselection while this reselection information was received from a legacy cell. Such a list comprises standalone 5G cells and where to find them. It enables the user equipment to search and find a standalone NR cell, instead of a legacy cell where the user equipment camped previously. It thus enables to derive neighbor 5G cells and technologies which needs to be evaluated for jamming detection according to the first steps of the invention.

Advantageously, the inter-RAT reselection system information includes a SIB24 system information block.

Those system information as defined by 3GPP standardization list NR standalone frequencies where cells being suitable for camping in new radio are deployed. This enables to restrict the searching for a cell to connect to 5G cells that will not need an underlying connection to a primary cell.

According to another feature, the checked stored system information, indicating new radio cells which can be used for camping and having been received on a new radio cell, provides intra-RAT reselection system information listing frequencies for cell re-selection, which can also be used for NR measurements being in idle or inactive.

Such an intra-RAT NR reselection cell listing enables to change frequency within the same RAT. This applies to cases where the primary cell is a NR one. This applies advantageously to between different deployed NR frequencies in FR1, i.e. switching from lower FR1 frequency range to higher 3.5 GHz range for capacity or coverage reasons and also for switching between cells in the two ranges of frequencies FR1 and FR2 for offloading purposes.

Advantageously, the intra-RAT reselection system information includes at least one of the following system information: SIB4 and SIB5.

Those standardized system information blocks gives a list of standalone cells in NR when available. Those cells are advantageously scanned for further jamming detection.

According to another feature, the method further comprises a step of checking if a stored system information indicates at least a secondary cell group, and the step of discarding the cells belonging to the secondary cell group only for further scanning.

This feature enables to avoid to try to connect to cells that will need a primary cell, i.e. to avoid to search for non-standalone cells. This avoids to lose energy and time to try to search and decode information of secondary cells that will rely on primary cells that could not be available. It enables a frequency configured for NSA and SA operation to be scanned while frequencies/cells for NSA only are excluded. Indeed cells and technologies there listed are discarded for the searching of the next cell and also for the jamming evaluation.

Advantageously, the stored system information indicating at least a secondary cell group includes at least one of the following system information: in case of LTE SIB2, SIB26a.

Those system information comprises secondary cell groups according to the standardized definition. SIB26 is defined as indicating NR secondary cell group i.e. EN-DC in the standard. SIB2 is defined as indicating LTE frequencies with cell suitable for secondary cell group.

The present invention also relates to a user equipment being adapted for communication with a base node of a new radio network (RN) acting on a new radio bandwidth in a given area, wherein the new radio network uses a specific carrier design to provide synchronization signals to the user equipment, said specific carrier design implementing multiple subcarrier spacing to broadcast multiple synchronization signal blocks where no cell specific reference signal is used but where at least one of the synchronization signal blocks is a cell defining synchronization signal block, said user equipment being adapted to implement the method of one of the preceding claims to detect a jamming situation affecting a communication, said user equipment having at least a measurement module to measure the new radio bandwidth, a decoding module to decode received synchronization signal block in the new radio bandwidth, a processing module for implementing the steps of the method according to at least one of the preceding claims depending on measurements and decoding performed according to the thus implemented steps in order to conclude that the user equipment is affected by a jamming situation.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed.

Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
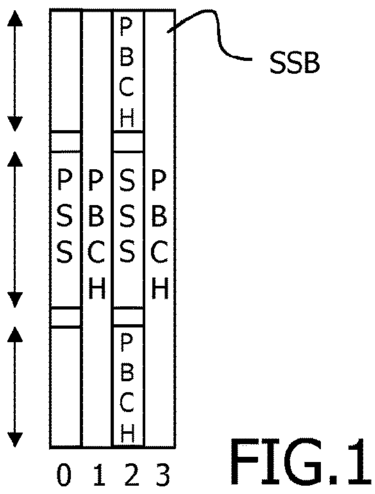
FIG. 1 schematically shows the structure of a synchronisation signal block.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the scope of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

FIG. 1 schematically shows the time-frequency structure of a synchronization signal and physical broadcast channel (PBCH) block SSB as defined in TS38.300. The synchronisation signal and PBCH block SSB consists of primary and secondary synchronisation signals PSS and SSS.

Polar coding is used for the physical broadcast channel PBCH which has its own dedicated measurement reference signal DMRS. PBCH symbols carry its own frequency-multiplexed Demodulation Reference Signal DMRS. Hence, besides PSS and SSS, said signal DMRS can also be used for broadcast evaluation and thus for jamming evaluation in 5G, as no cell specific references exist. Indeed all of the three signals can be used for the measurements but, where DMRS plays a role, decoding is only on PBCH/MIB. These reference signal DMRS can be used for the measurement evaluation part, for the decoding part and for the conclusion, if received, whether jammed or not as this conclusion depends on the decoded content of the PBCH.

Figure 2:
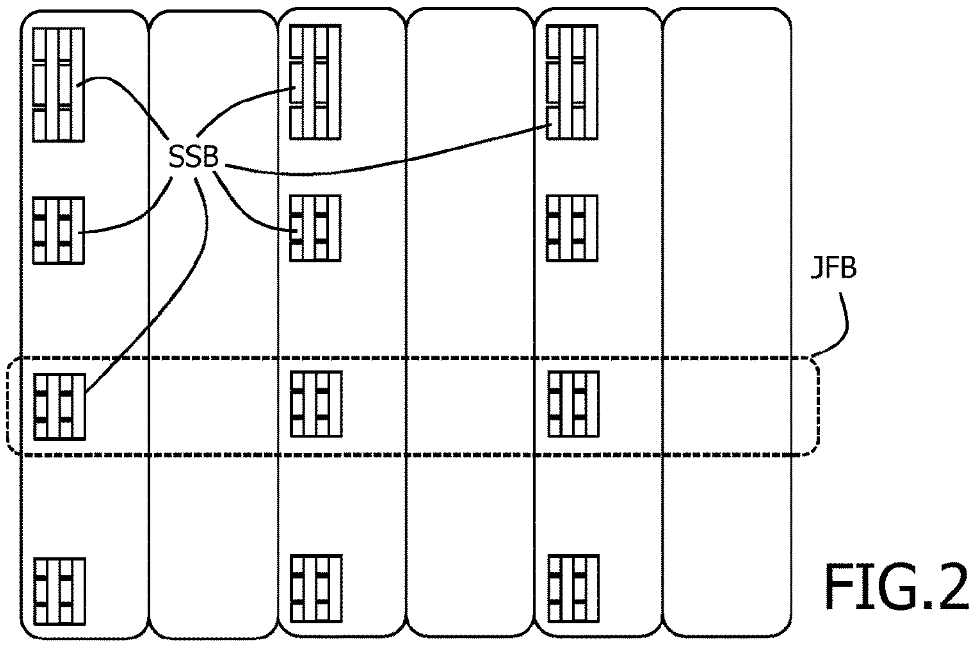
FIG. 2 shows a 5G frame emission with multi subcarriers as observed in wideband deployments in new radio communication and illustrates the action of a jammer with respect to the emitted base station signals.

FIG. 2 schematically shows a 5G frame emission from a given cell in a base station communicating in new radio.

With the frequency span of a carrier, multiple SSB are transmitted.

Indeed new radio 5G provides multiple SS-blocks for one of the following reasons:

- Wideband deployment with different bandwidth part (BWP) allocations to the user equipment. It means that a device only needs to receive a fraction of the band and this bandwidth part BWP may even have different subcarrier-spacing. To ease the measurements and make them less complex for devices, it is likely that, also for all SCS present on the emitted carrier, an SS-block is provided as reference (chapter 6.10 in TS38.300),
- Neighbor cell measurements. Avoiding cell specific references (clean carrier design) makes throughput in dedicated mode quite high. However, the absence of these measurement references impacts neighbour cell measurements especially inter-frequency. It makes mobility within NR complicated, as specific band parts need to be received for measurements. Hence providing several SS-blocks, with preferably at least once in each SCS present on the emitted carrier, makes mobility options easier and less power consuming,
- Inter-RAT or inter-system measurements for LTE-NR and NR-NR tight inter-working. Many chipsets are not able to operate or analyse carriers with different subcarrier spacings and if being able this is more complex and power consuming than staying for neighbour cell measurements within the same SCS. This differs strongly with legacy RAT as LTE has a fixed SCS of 15 kHz.

So for any of these reasons there will be several SSB-blocks in frequency domain but not all will serve as defining a cell.

As defined in TS 38.300 5.2.4 concerning SS-block frequency distribution, within the frequency span of a carrier, multiple SSBs can be transmitted. More than one SSB is used in a realistic scenario to ease neighbor cell measurement and BWP allocation. The physical cell identity PCI of SSB transmitted in different frequency locations do not have to be unique, but at least one cell defining synchronisation signal block CD-SSB is present.

The PCIs of SSBs transmitted in different frequency locations do not have to be unique, i.e. different SSBs in the frequency domain can have different PCIs, which means defining different cells. Indeed, when an SSB is associated with a remaining minimum system information RMSI, the SSB is referred to as a Cell-Defining SSB (CD-SSB). A PCell is always associated to a CD-SSB located on the synchronization raster. It means that the emission of a 5G cell contains at least a cell defining SSB. The at least one cell can be a NSA or SA cell which can be seen from the content of the CD-SSB. In case of a 5G SA cell said CD-SSB contains necessary indications for SIB1 presence and decoding, in case of NSA cell it indicates the absence of SIB1.

An SS block is cell defining when it contains a remaining minimum system information RMSI which is the minimum system information set.

Without the RMSI to be provided a user equipment cannot access the cell as the RMSI consists of the master information block MIB and contains following information according to TS38.331.

```
MIB
-- ASN1START
-- TAG-MIB-START
MIB ::=                     SEQUENCE {
   systemFrameNumber            BIT STRING (SIZE (6)),
   subCarrierSpacing Common       ENUMERATED       {scs15or60,
scs30or120},
   ssb-SubcarrierOffset         INTEGER (0..15),
   dmrs-TypeA-Position          ENUMERATED {pos2, pos3},
   pdcch-ConfigSIB1             PDCCH-ConfigSIB1,
   cellBarred                 ENUMERATED {barred, notBarred},
   intraFreqReselection         ENUMERATED {allowed, notAllowed},
   spare                      BIT STRING (SIZE (1))
}
-- TAG-MIB-STOP
-- ASN1STOP
```

With respect to the MIB, following definitions apply according to 3GPP TS38.331. The ssb-SubcarrierOffset field may indicate that this cell does not provide SIB1. The pdcch-ConfigSIB1 determines a common search space and necessary PDCCH parameters for SIB1. If the field ssb-SubcarrierOffset indicated that SIB1 is absent, the field pdcch-ConfigSIB1 indicates the frequency positions where the UE may find SS/PBCH block with SIB1 or the frequency range where the network does not provide SS/PBCH block with SIB1 (see TS 38.213 [13]).

Without the content of the master information block MIB, no cell acquisition is possible.

An advanced jamming attack would only mask the relevant signal. In an even better jamming attack, in FR2 and high FR1 bands, a jammer may not be able to fully mask the entire bandwidth and rather focuses on the sensitive part. It means only jam the CD-SSB which most likely is in the centre SSB. But its presence can also earlier be evaluated by a handset or application showing the necessary data.

Contrarily to legacy the synchronisation signal blocks including primary and secondary synchronisation channel P-SCH and S-SCH in PBCH may be contained several times within the frequency domain and all the synchronisation signal blocks in new radio are not cell defining SS blocks CD-SSB. The emission of the cell may also contain SSB of different width depending on subcarrier spacing SCS used for certain bands depending on available bandwidth.

The cell defining SSB contains at least remaining minimum system information RMSI or where it is located in case of an SA cell and indicates its absence in case of an NSA cell, as defined in the standard including an indication of where the first system information block SIB1 necessitated for the connection to the defined cell is present. It means that the PBCH contains the RMSI, i.e. it clarifies the existence and position of the SIB1. Without such indication about this system information a user equipment cannot acquire the cell. SIB1 itself is not in the SSB but only the information whether a SIB1 is present and if present where to find it. This is designated in the claims as "SIB1 presence indication".

The frequency width is given in subcarriers and, depending on the subcarrier spacing, different bandwidth of the blocks in frequency domain can be occupied. This is visible on FIG. 2 where four SSB are emitted by the 5G cell. An SS-block always requires 240 subcarriers leading to different bandwidth occupancy of an SS-block for different subcarrier spacings.

In 5G, as illustrated by a dashed line square on FIG. 2, a jammer thus only needs to mask a bandwidth part JFB which contains the cell defining SS-block CD-SSB to jam the entire cell. Most likely such a SS-block will be transmitted on the 15 kHz SCS in frequencies below 3 GHz and at 30 kHz in 3 GHz which means having a bandwidth of ~4 MHz or 8 MHz. In FR2 i.e. above 6 GHz the minimum subcarriers spacing is 120 kHz per definition, hence leading to a bandwidth in FR2 for an SS-block of ~28 MHz.

Time domain and frequency can of course vary depending on subcarrier spacing and various other higher layer parameters.

Different sub carriers pacing are adopted depending on the situation and on the coverage. For example outdoor and macro coverage, outdoor and small cell, indoor wideband and millimetre wave (FR2 spectrum as defined in the standard) will have different bandwidths size, typically from 5 to 500 MHz, and will implement various subcarrier spacing which can be between 15 to 60 kHz in FR1 and 120 KHz to 480 kHz in FR2, for example depending on the situation and the coverage.

Figure 3:
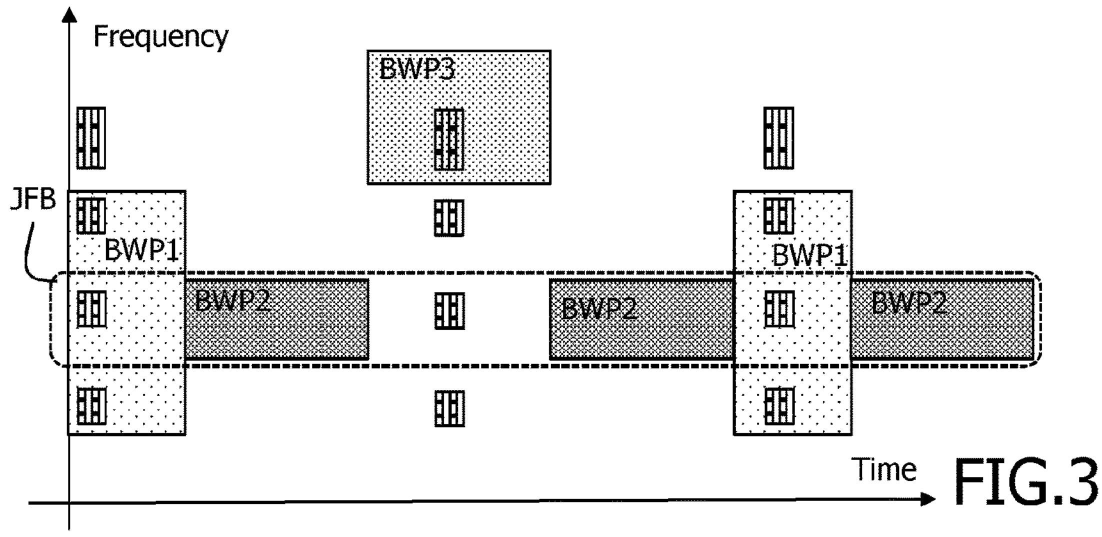
FIG. 3 shows bandwidth part allocation of a user equipment with different subcarrier spacing for certain bands depending on the available bandwidth and illustrates also the action of a jammer on the user equipment side.

FIG. 3 shows a bandwidth parts BWP allocation on the side of the user equipment as defined in the standard (TS38.300) with the signals as received from the cell of the base station of which the emission is disclosed on FIG. 2. It is here seen that SSB can appear in certain frames, all occurrences within on sub frame relate to different beams from the cell and they have a certain periodicity in time coming from a same cell. Besides time domain there may also be several appearances in frequency domain which are the interesting once for jamming evaluation.

In such a deployment it would make sense to have the CD-SSB in the overlapping frequency area of BWP1 and 2 and to have an extra SS block for BWP3.

The BWP are illustrated with various patterns. BWP1 is illustrated with a lightly dotted area, BWP2 is illustrated with a densely dotted area and BWP3 with a medium dotted area.

During a half-frame, different SSB may be transmitted in different spatial directions, i.e. using different beams spanning the coverage area of the cell in the base station.

Here also a jamming action is illustrated by a dashed line square covering a limited frequency band JFB. It hides the third SSB that is in the overlapping part of BWP1 and BWP2.

Figure 4:
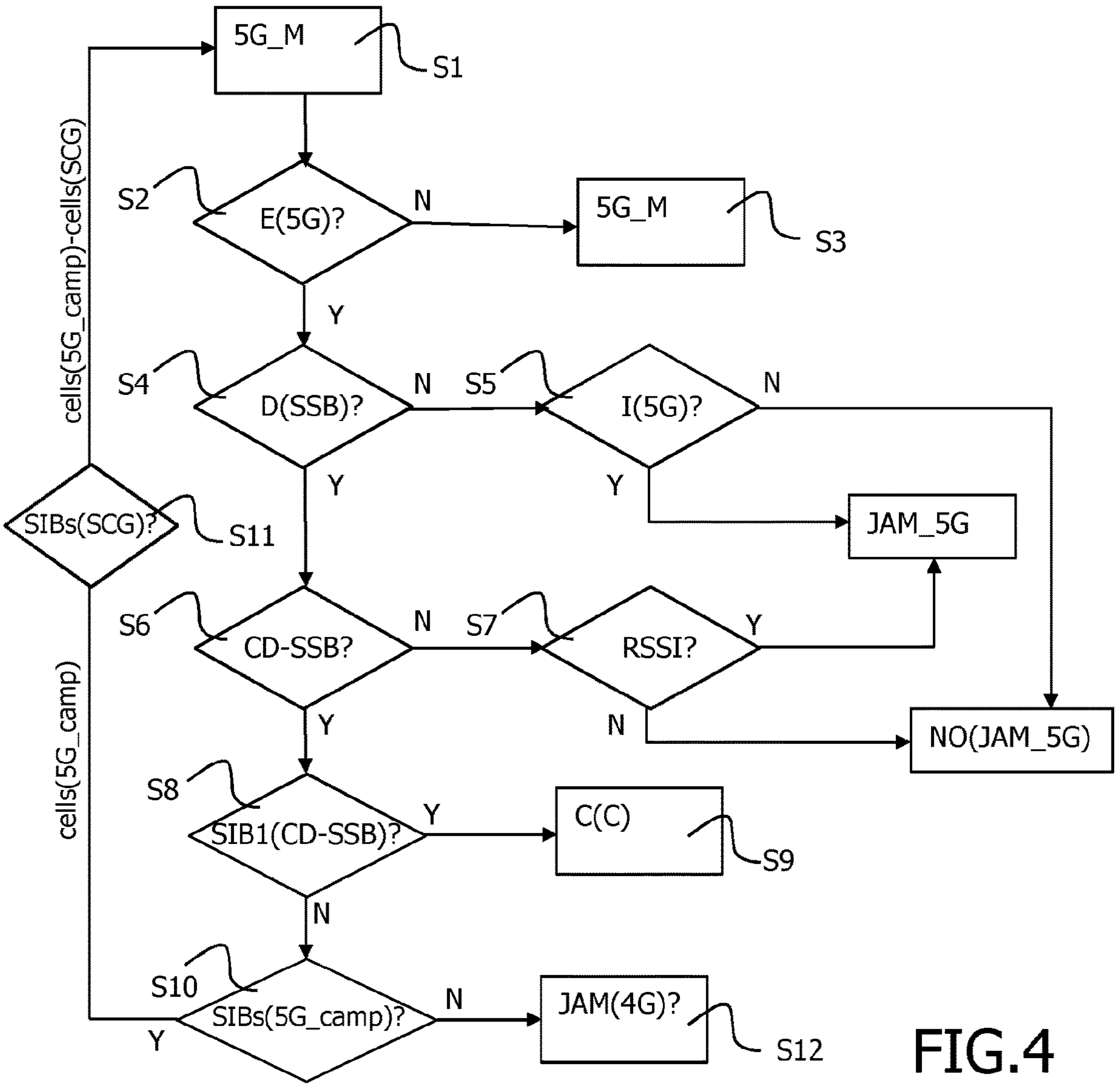
FIG. 4 shows a flowchart of the method of the invention.

FIG. 4 is a flowchart of the method of the invention. In a first step S1, the user equipment measures a 5G band 5G_M. In a second step S2, the user equipment detect if the energy in the band E(5G) is sufficient is sufficient to decode a SSB. If the energy is not sufficient to decode at least a synchronisation block (case N), it is concluded that new radio is not deployed on said band in a step S3. Then, if the measured energy is sufficient, it attempts to decode at least a found synchronisation signal block in a step S4.

If the decoding is not possible (case N), the user equipment verifies if there is an indication I(5G) that 5G should be deployed on said band in a step S5. This knowledge the user equipment may have gained from earlier camping or from corresponding system information received or from deployment information on NR stored in the device.

If not (case N), the user equipment concludes that there is a low probability for jamming and a situation of absence of jamming NO(JAM) is thus detected.

If the decoding is not possible in step S4 and if there is an indication I(5G) that the 5G is deployed on this band in step S5, the user equipment concludes that there is a high probability for jamming and a jamming situation JAM is thus detected.

Then if, in a step S6, at least one SSB can be decoded (case Y), the user equipment checks that a cell defining synchronization signal block SSB is decoded.

If not (case N), the user equipment checks if one of the bandwidth part BWP shows a high received signal strength indicator RSSI in a step S7.

If yes (case Y), the user equipment concludes that there is a high probability for jamming and a jamming situation JAM is detected.

If not (case N), the user equipment concludes that there is a low probability for jamming and an absence of jamming NO(JAM) is detected.

If yes at step S6 (case Y), the user equipment can pursue the procedure to connect to the 5G cell if ever access information are available, else in the cell defining SSB or in previously stored system information.

At step S6, it is noted that a non-standalone cell can provide cell defining SSB among the SSB that are sent by the cell but said cell defining SSB does not have a SIB1 indication present or the indication says that no SIB1 is present in this cell. In such a case, step S6 falls in case Y anytime.

Thus, in a step S8, the user equipment checks the presence of a first system information block SIB1 indication, or RMSI, in the cell defining SSB. In case a first system information block SIB1 indication is found, the SIB1 is thus accessed and the user equipment further proceeds to its connection C(C) to the given cell in a step S9 to operate and camp normally.

If no access information, i.e. SIB1 is present for the cell, then, in a step S10, the user equipment reads previously received system information if ever stored to retrieve a list of 5G cells and frequencies where connection and camping are possible. The user equipment then scans these cells and frequencies and implements again the first steps of the method with other cells.

Advantageously, in a step S11, further system information relative to a secondary cell group is read. Such group lists the available non-standalone cells for reselection. The user equipment then exclude the cells as listed in the secondary cell group to the ones to be further scanned. It is here noted that a fixed device will also always see same set of neighbor cells and relative stored information can thus be used. However, according to TS38.331, system information needs to be refreshed after 3 hours.

If, in step S10, no lists of cells and frequencies suitable for connection and camping with 5G are stored, a jamming evaluation only on LTE needs to be performed or if already done said LTE result can be used for concluding on jamming and thus detected in a step S12.

Figure 5:
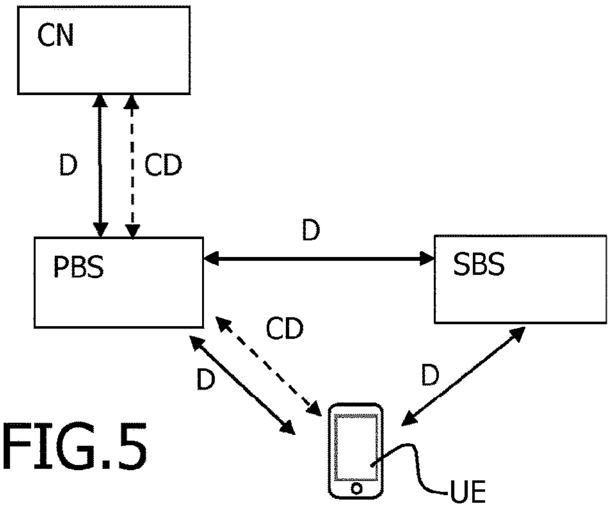
FIG. 5 shows schematically a non-standalone cell implementation.

FIG. 5 shows schematically a non-standalone architecture. In such architecture a core network CN is connected to a primary base station PBS, which can be of LTE or new radio type, for communication of data D and control data CD. The control data CD, including all access information SIB1 etc, are communicated by the primary base station. It means that a user equipment UE receives all access information CD via the primary base station and its connection to this cell. A secondary base station SBS of the new radio kind is used only as a booster for data D. It is not possible for the user equipment to connect directly to the secondary base station SBS or to camp at this secondary base station. This architecture relies on legacy core network and thus does not need a NextGen Core. It hence allows early availability of 5G air interface. Same radio architecture exists also with a 5G core which is called late drop but has the same principles of this outlined NSA architecture.

In terms of jamming it means that jamming can be detected on the primary base station PBS and for such architectures this would be sufficient.

Normally jamming is evaluated per technology and carrier hence even so the jamming is detected on the primary base station PBS, a simple algorithm would proceed with other cells and later technologies (i.e. NR) available and hence it can occur that the user equipment further search for all secondary cells. It generates a loss of energy and delays the final jamming conclusion for the user equipment. By default, it also has no contribution to the confidence level of jamming, as secondary cells are not accessible on their own.

The invention proposes a further sequence of steps in such a situation. To really see and evaluate the advantage the invention brings, the sequence for a device being capable of LTE and NR when attaching is the following.

The user equipment starts/is camping with LTE according to TS36.331 Rel.-15 by reading the content of system information SIB2 which contains the following:

```
SystemInformationBlockType2 information element:
  PLMN-InfoList-r15 ::= SEQUENCE (SIZE (1..maxPLMN-r11)) OF PLMN-
Info-r15
  PLMN-Info-r15 ::= SEQUENCE {
    upperLayerIndication-r15    ENUMERATED {true} OPTIONAL -- Need
OR
  }
  -- ASN1STOP
```

Here, "upperLayerIndication" is an indication to upper layers that the user equipment has entered a coverage area that offers 5G capabilities.

Thus, if the user equipment is configured to operate in Evolved-Universal Terrestrial Radio Access (LTE)-New Radio dual connectivity, means E-UTRA NR Dual connectivity or short (EN-DC) as result of this procedure, this upperLayerIndication is forwarded to upper layers as if the user equipment receives this field from SIB2. Otherwise the user equipment indicates the upper layers absence of this field.

Another system information is advantageously also decoded and read in case of being connected or camping on NR, it is system information block SIB26a which contains the following:

SystemInformationBlockType26a field descriptions:

bandListENDC=A list of NR bands which can be configured as SCG (secondary cell group) in EN-DC operation with serving cell for the forwarding of upperLayerIndication to upper layers.

It means that all the indicated 5G frequencies refer to 5G bands which serve as secondary cell group. This list is present in case non-standalone architecture options are implemented. Hence the cells/frequencies listed in SIB26a do not qualify for camping. It can however occur that these cells/frequencies appears in other system information, like the following disclosed SIB24.

In opposite to higher layer indication SIB24 provided in LTE according to TS36.331 indicates the NR frequencies which can be used for camping:

SystemInformationBlockType24

The IE SystemInformationBlockType24 contains information relevant for inter-RAT cell re-selection (i.e. information about NR frequencies and NR neighbouring cells relevant for cell re-selection), which can also be used for NR idle/inactive measurements. The IE includes cell re-selection parameters common for a frequency.

It means that, in case of jamming detection, a user equipment can discard all frequencies and related cells indicated in SIB2 upper layer information. The user equipment only needs to do jamming evaluation on those frequencies being present in this system information SIB24 as they can serve as standalone cells, which means that they are suitable for camping. Also, if they appear in both SIB2 and SIB24, they need to be scanned.

If SIB24 is absent, only SIB2 has upper layer indication on 5G. Indeed if SIB24 indication is not present there is no need to involve 5G in further jamming evaluation for said public land mobile network PLMN as no campable 5G cell are present. In such a case the device should beneficial only evaluate LTE and other cells present and skip for jamming evaluation measurements and decoding attempts on 5G.

A user equipment in LTE which has stored system information in case of jamming occurs in LTE, performs after LTE analysis a jamming evaluation of 5G according to the invention. This jamming evaluation further depends on the stored system information especially related to SIB2 and SIB24 whether 5G is to be further analysed for jamming or not. In case of only non-standalone architecture is present, the need to further analysis, is useless. The method of the invention enables to restrict the evaluation to 5G standalone cells in case NSA and SA cells are present.

The above specifically concerns the architecture option 3 (SIB2 and SIB24) as defined in the standard. In general the respective SIBs of the master radio technology are used which are either the SIBs provided in LTE, or SIB information provided in NR for which the following information is used in addition (besides SIB26a for secondary cell group).

In TS38.331 Rel.-15, the following can be found:

In case NR-DC or NE-DC is configured, this also includes the entire NR or E-UTRA SCG configuration which are . . . .

Here it means that all frequencies supposed to be used as secondary cell can be identified using standardized system information. Hence accordingly the cells which are not included in neighbor cell information list are not intended for camping, which means that they can be excluded from jamming evaluation.

Without prior knowledge, i.e. without stored information, and without the invention, a user equipment will discard any cell not having SIB1 Standalone indication present as not suited for camping and only serving as secondary cell. But performing such a scan for all possible available 5G bands is time consuming. The invention enables to restrict scanning on those bands which are indicated as suitable camping cells. Hence scan is restricted to the bands being suitable to setup a connection and to register on them.

Suitable inter-frequency candidates which may serve as master cell/PCELL when the current serving frequency/cell is jammed are indicated by SIB4. Thus, with the invention, while a device camps on NR and is jammed, it only shall measure other NR cells or EUTRA cells indicated as suitable for camping by SIB4 and shall discard other bands only indicated for EN-DC or E-UTRAN New Radio-Dual Connectivity (NR-DC) or new radio dual connectivity (NR-NR). The reason to discard those bands, especially those in the high bands, i.e. FR2 und upper FR1 part, is that they may not provide the relevant information for being able to camp on.

SIB4 Information Element

SIB4 contains information relevant for inter-frequency cell re-selection (i.e. information about other NR frequencies and inter-frequency neighbouring cells relevant for cell re-selection), which can also be used for NR idle/inactive measurements. The IE includes cell re-selection parameters common for a frequency as well as cell specific re-selection parameters.

The method of the invention enables to evaluate jamming situation on New radio, but not limited to new radio, based on previously stored system information to avoid scanning of cells which are present but only to intend as secondary cell group, i.e. in case of connected mode for data transfer but not suited for connection setup or camping.

The method of the invention considers stored system information on neighbor cells and technologies to derive those of them which need to be evaluated or can be discarded during jamming evaluation. This leads to a faster and more robust jamming detection procedure against advanced jamming attacks as the conventional wideband jammer evaluators.

The invention enables only master cells to be evaluated for non-standalone architecture and jamming detection procedure is made dependent of stored information which indicate standalone deployment or non-standalone deployments.

Especially neighbor cell information and information related to architecture i.e. SCG restrictions of cells in NR or especially higher layer indication and content of SIB26a in NR are used to refrain from scanning those frequencies and only focus on those indicated as suitable neighbor cells i.e. by SIB24 in LTE for NR neighbors or by SIB4 and SIB5 for NR and EUTRA neighbors when camping on NR.

The invention thus further proposes a jamming detection solution for 5G non-standalone deployments while first steps of the invention are focused on jamming detection related to standalone cells. The invention also enables to save time and energy as, with the invention, the device does not measure and decode all 5G cells which indicate not being campable. This leads to a far faster and easier analysis also considering neighbor cell signaling in LTE including SIB24 if such cells are present.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted.

The invention claimed is:

1. A method to detect a jamming situation, affecting a communication user equipment, said user equipment being adapted for communication with a base node of a new radio network (RN) acting on a new radio bandwidth in a given area, wherein the new radio network uses a specific carrier design to provide synchronization signals to the user equipment, said specific carrier design implementing multiple subcarrier spacing to broadcast multiple synchronization signal blocks where no cell specific reference signal is used but where at least one of the synchronization signal blocks is a cell defining synchronization signal block, said user equipment, being in the given area and having further access to an indication that new radio is deployed in this given area, said method comprising the steps of, for the user equipment:

measuring the new radio bandwidth and, in case of detection of an energy in the measured band sufficient for decoding found synchronization signal blocks;

attempting to decode at least a synchronization signal block in the new radio bandwidth, in the case no decoding is possible and in presence of an indication that new radio is deployed in this area, concluding that the user equipment is affected by a jamming situation, in the case a decoding of at least one synchronization signal block is possible, checking that a cell defining synchronization signal block is decoded, if no cell defining synchronization signal block is decoded, verifying if a part of the new radio bandwidth shows a high received signal strength indication, if yes, concluding that the user equipment is affected by a jamming situation.

2. The method according to claim 1, further comprising, following the step of verifying if a part of the new radio bandwidth shows a high received signal strength energy which should be sufficient for signal decoding, a step of verifying that this part of the new radio bandwidth showing a high received signal strength energy has a bandwidth sufficient to hide a synchronization signal block, before concluding that the user equipment is affected by a jamming situation.

3. The method according to claim 1, said user equipment monitoring a confidence level register regarding jamming, once a jamming situation detected, said method further comprises the step of searching next frequency band and the step of increasing the confidence level register in case same result is obtained while applying the method to next frequency band.

4. The method according to claim 3, wherein the confidence level register is reset to zero if any of the scanned band is fully accessible.

5. The method according to claim 1, said method further comprising:

in case a cell defining synchronization signal block is decoded, checking if a first system information block comprising access information to access to the cell is indicated, if no first system information block SIB1 indication is present in the cell defining synchronization signal block, checking if a stored system information indicating new radio cells which can be used for camping is available, if yes, scanning the indicated new radio cells, detecting further jamming situation if ever by applying the present jamming detection method in new radio while scanning these indicated new radio cells.

6. The method according to claim 5, wherein the checked stored system information indicating new radio cells which can be used for camping and having been received using a previous camping radio access technology, comprises inter-RAT reselection system information listing frequencies for inter-RAT cell re-selection, which can also be used for NR measurements.

7. The method according to claim 6, wherein the inter-RAT reselection system information includes a SIB24 system information block.

8. The method according to claim 5, wherein the checked stored system information, indicating new radio cells which can be used for camping and having been received on a new radio cell, provides intra-RAT reselection system information listing frequencies for cell re-selection, which can also be used for NR measurements.

9. The method according to claim 8, wherein the intra-RAT reselection system information includes at least one of the following system information: SIB4 and SIB5.

10. The method according to claim 5, further comprising a step of checking if a stored system information indicates at least a secondary cell group, and the step of discarding the cells belonging to the secondary cell group only for further scanning.

11. The method according to claim 10, wherein the stored system information indicating at least a secondary cell group includes at least one of the following system information block: SIB2 in LTE, SIB26a in NR.

12. A user equipment being adapted for communication with a base node of a new radio network (RN) acting on a new radio bandwidth in a given area, wherein the new radio network uses a specific carrier design to provide synchronization signals to the user equipment, said specific carrier design implementing multiple subcarrier spacing to broadcast multiple synchronization signal blocks where no cell specific reference signal is used but where at least one of the synchronization signal blocks is a cell defining synchronization signal block, said user equipment being adapted to implement the method of to detect a jamming situation affecting a communication by:

measuring the new radio bandwidth and, in case of detection of an energy in the measured band sufficient for decoding found synchronization signal blocks;

attempting to decode at least a synchronization signal block in the new radio bandwidth, in the case no decoding is possible and in presence of an indication that new radio is deployed in this area, concluding that the user equipment is affected by a jamming situation, in the case a decoding of at least one synchronization signal block is possible, checking that a cell defining synchronization signal block is decoded, if no cell defining synchronization signal block is decoded, verifying if a part of the new radio bandwidth shows a high received signal strength indication, if yes, concluding that the user equipment is affected by a jamming situation;

wherein said user equipment having at least a measurement module to measure the new radio bandwidth, a decoding module to decode received synchronization signal block in the new radio bandwidth, a processing module for implementing the steps of the method according to at least one of the preceding claims depending on measurements and decoding performed according to the thus implemented steps in order to conclude that the user equipment is affected by a jamming situation.

* * * * *